(12) United States Patent
Dong et al.

(10) Patent No.: US 10,991,504 B2
(45) Date of Patent: Apr. 27, 2021

(54) MAGNETIC ASSEMBLY

(71) Applicant: Delta Electronics, Inc., Taoyuan (CN)

(72) Inventors: Jianxing Dong, Taoyuan (CN); Yong Zeng, Taoyuan (CN); Teng Liu, Taoyuan (CN); Jianping Ying, Taoyuan (CN)

(73) Assignee: Delta Electronics, Inc., Taoyuan (CN)

( * ) Notice: Subject to any disclaimer, the term of this patent is extended or adjusted under 35 U.S.C. 154(b) by 146 days.

(21) Appl. No.: 15/992,329

(22) Filed: May 30, 2018

(65) Prior Publication Data
US 2018/0350511 A1    Dec. 6, 2018

(30) Foreign Application Priority Data

May 31, 2017  (CN) .......................... 201710398335.7

(51) Int. Cl.
| H01F 27/29 | (2006.01) |
| H01F 27/28 | (2006.01) |
| H01F 27/24 | (2006.01) |
| H01F 27/32 | (2006.01) |
| H02K 3/40 | (2006.01) |
| H01F 27/30 | (2006.01) |

(Continued)

(52) U.S. Cl.
CPC .......... *H01F 27/2852* (2013.01); *H01F 3/14* (2013.01); *H01F 27/24* (2013.01); *H01F 27/245* (2013.01); *H01F 27/30* (2013.01); *H01F 27/306* (2013.01); *H01F 27/323* (2013.01); *H01F 27/324* (2013.01); *H02K 3/40* (2013.01); *H01F 2027/329* (2013.01)

(58) Field of Classification Search
USPC ....................................................... 336/192
See application file for complete search history.

(56) References Cited

U.S. PATENT DOCUMENTS 2,886,791 A * 5/1959 Barengoltz ............. H01F 30/12
                                                   336/197
3,358,256 A * 12/1967 Naito ...................... H01F 19/00
                                                    336/83

(Continued)

FOREIGN PATENT DOCUMENTS

| CN | 87215263 U | 11/1988 |
| CN | 1220039 A | 6/1999 |

(Continued)

OTHER PUBLICATIONS

The CN1OA dated Feb. 3, 2020 by the CNIPA.
The CN2OA dated Oct. 12, 2020 by the CNIPA.

*Primary Examiner* — Ronald Hinson
(74) *Attorney, Agent, or Firm* — Qinghong Xu

(57) ABSTRACT

A magnetic assembly includes a magnetic core and a winding. The magnetic core comprises an upper cover, a lower cover and at least one core column provided between the upper cover and the lower cover, the core column presents a prismatic shape and has at least two lateral surfaces, the lateral surfaces intersect with each other to form at least two longitudinal ridges, and the longitudinal ridge extends along the longitudinal direction of the core column. The winding, winding around the core column, a first semi-conductive component is provided between the core column and the winding at the position corresponding to the longitudinal ridge.

15 Claims, 7 Drawing Sheets

(51) Int. Cl.
*H01F 3/14* (2006.01)
*H01F 27/245* (2006.01)

(56) References Cited

U.S. PATENT DOCUMENTS

| | | | | |
|---|---|---|---|---|
| 3,436,704 | A * | 4/1969 | Palumbo | H01F 41/127 |
| | | | | 336/70 |
| 6,608,544 | B2 * | 8/2003 | Yoshioka | H01F 27/266 |
| | | | | 336/178 |
| 9,711,276 | B2 * | 7/2017 | Mashikian | H01F 27/289 |

FOREIGN PATENT DOCUMENTS

| | | |
|---|---|---|
| CN | 1244289 A | 2/2000 |
| CN | 101331561 A | 12/2008 |
| CN | 201549358 U | 8/2010 |
| CN | 101944423 A | 1/2011 |
| CN | 101944423 B | 11/2011 |
| CN | 102982970 A | 3/2013 |
| CN | 102982986 A | 3/2013 |
| CN | 104851563 A | 8/2015 |
| CN | 205582707 U | 9/2016 |
| CN | 206098123 U | 4/2017 |

* cited by examiner

MAGNETIC ASSEMBLY

CROSS REFERENCE

This application is based upon and claims priority to Chinese Patent Application No. 201710398335.7, filed on May 31, 2017, the entire contents thereof are incorporated herein by reference.

TECHNICAL FIELD

The present disclosure relates to a magnetic assembly.

BACKGROUND

In medium-high voltage electric system, the volume and weight occupied by the medium-high voltage reactor or the medium-high voltage transformer etc. of the magnetic assembly are large.

However, higher requirements of the power density and reliability of the magnetic assembly may be put forward as with the medium-high voltage electric systems continues to evolve.

However, the above-mentioned magnetic assembly has a high operating voltage and a severe working environment, which may easily cause partial discharge between the winding and the core column. In the conventional technology, the partial discharge is reduced mainly by increasing the distance between the winding and the core column, however, the above method greatly increases the volume of the magnetic assembly, and it is difficult to compromise reliability and power density requirements.

Therefore, there is an urgent need to develop a magnetic assembly that overcomes the above drawbacks.

The above information disclosed in this BACKGROUND section is only for enhanced understanding of the background of the disclosure and therefore it may contain information that does not constitute the relevant technology known to those skilled in the art.

SUMMARY

The additional aspects and advantages of the disclosure will partly be set forth in the following description, and partly become apparent from the description or may be learnt from practice of the disclosure.

According to one aspect of the present disclosure, a magnetic assembly for a medium and high voltage electric system comprises a magnetic core and a winding. The magnetic core comprises an upper cover, a lower cover and at least one core column provided between the upper cover and the lower cover, the core column presents a prismatic shape and has at least two lateral surfaces, the lateral surfaces intersect with each other to form at least two longitudinal ridge, and the longitudinal ridge extends along the longitudinal direction of the core column. The winding, winding around the core column, a first semi-conductive component is provided between the core column and the winding at the position corresponding to the longitudinal ridge.

BRIEF DESCRIPTION OF THE DRAWINGS

The above and other features and advantages of the disclosure will become more apparent by describing exemplary embodiments of the disclosure with reference to the accompanying drawings.

DETAILED DESCRIPTION

Figure 1:
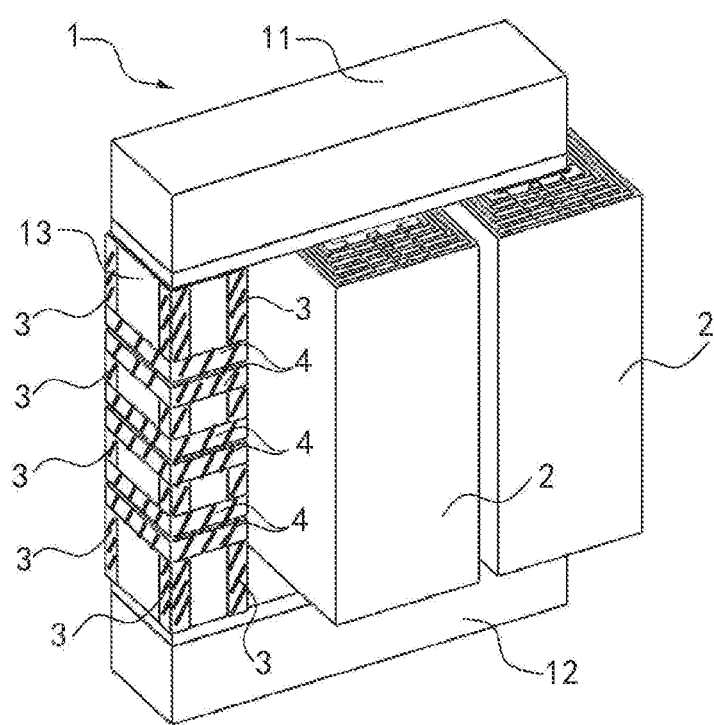
FIG. 1 shows a perspective view of the magnetic assembly according to the first embodiment of the present disclosure.

Now the exemplary embodiments will be described more fully with reference to the accompanying drawings. However, the exemplary embodiments can be implemented in various ways and should not be construed as limited to the embodiments set forth herein; rather, these embodiments are provided to make the disclosure full and complete and to fully convey the concept of the exemplary embodiments to those skilled in the art. The same reference numerals through the drawings denote the same or similar structures, and thus their detailed description will be omitted.

The present disclosure provides a semi-conductive component between the core column and the winding, at the position corresponding to the longitudinal ridges, which may homogenize electric field strength, such that the electric field intensity throughout the magnetic assembly tends to be uniform, thereby reducing the risk of partial discharge.

The present magnetic assembly may be a medium-high voltage transformer or a medium-high voltage differential mode reactor, a medium-high voltage common mode reactor, etc. In the following embodiment, the medium-high voltage differential mode reactor will be described as an example.

Embodiment 1

Referring to FIG. 1, FIG. 1 is a perspective view of the magnetic assembly according to the first embodiment of the present disclosure. As shown in FIG. 1, the differential mode reactor of the present disclosure includes: a magnetic core 1 and a winding 2. The magnetic core 1 includes an upper cover 11. a lower cover 12 and three core columns 13 provided between the upper cover 11 and the lower cover 12. The winding 2 is wound around the core column 13. In other embodiments, the number of the core column is not limited to three, but can be appropriately increased or decreased according to specific conditions.

The core column 13 represents a shape of quadrangular pyramid, having 4 longitudinal ridges along a longitudinal direction. All of the upper cover 11. the lower cover 12 and the core column 13 may be stacked from silicon steel sheets, or made be made of ferrite, etc., the present disclosure is not limited thereto.

In other embodiments, the core column 13 may be a cylinder with a polygonal cross section such as a prism with two, three, four, five, or six longitudinal ridges. That is, any prism, having at least two lateral surfaces, which intersect with each other to form the longitudinal ridge, is applicable to the present disclosure.

The embodiment further includes: a first semi-conductive component, which includes multiple first semi-conductive tape 3, respectively pasted on four ridges of the core column 13 in this embodiment. Most of the middle area of four lateral surfaces away from the ridges is not covered, thus decreasing the effect of the first semi-conductive tape 3 on thermal performance. The number of the first semi-conductive tape 3 may be the same as the number of the longitudinal ridges of the bobbin 13, ensuring that each longitudinal ridge may be covered by the first semi-conductive tape 3. The first semi-conductive tape 3 may be made from semi-conductive material such as silicone rubber or Ethylene-propylene rubber, etc.

In other embodiments, the first semi-conductive tape 3 may also be replaced by other forms of semi-conductive components such as the first semi-conductive paint layer. Compared to metal materials, semi-conductive parts have high resistivity and low eddy current losses.

Further, in case that an air gap is opened in the core column 13, a second semi-conductive component is provided between the air gap and the winding 2. The second semi-conductive component 20 includes multiple second semiconducting tapes in this embodiment. In other embodiments, the second semi-conductive component 20 may also be replaced by other forms of semi-conductive components, such as the materials of the first semi-conductive component 10.

Specifically, as shown in FIG. 1, multiple first air gaps may be defined in the core column 13, for example, the core column 13 is divided to multiple stacked small quadrangular prisms, thus the first air gap is respectively defined between the adjacent small quadrangular prisms. A transverse ridge is formed at the position where the first air gap is defined on the core column 13, that is, the transverse ridge is formed at the intersection of the upper surface and the lower surface of one small quadrangle with the lateral surface. In this embodiment, the second semi-conductive component 20 includes multiple second semiconducting tapes 4, which are respectively pasted on multiple transverse ridges.

In this embodiment, taking into account the requirements of the safety distance, a certain distance is usually left between the winding 2 and any one of the upper cover 11 and the lower cover 12. In other words, end transverse ridges on the core column 13 adjacent to the upper cover 11 and the lower cover 12 are relatively far away from the winding 2, where the electric field intensity is low, so the end traverse ridges may not be necessarily pasted by the second semi-conducting tape 4, which may not only save materials, but also reduce the production process, reduce labor intensity, and is conducive to heat dissipation. However, the present disclosure is not limited thereto. In other embodiments, the end transverse ridges may also be wrapped by the second semiconducting tape 4.

In the first embodiment, the semi-conductive tapes are pasted on the longitudinal ridges and the transverse ridge of the core column 13, homogenizing the electric field strength between the core column and the winding, reducing the risk of partial discharge in the reactor and increasing the service life of the reactor.

Embodiment 2

Figure 2:
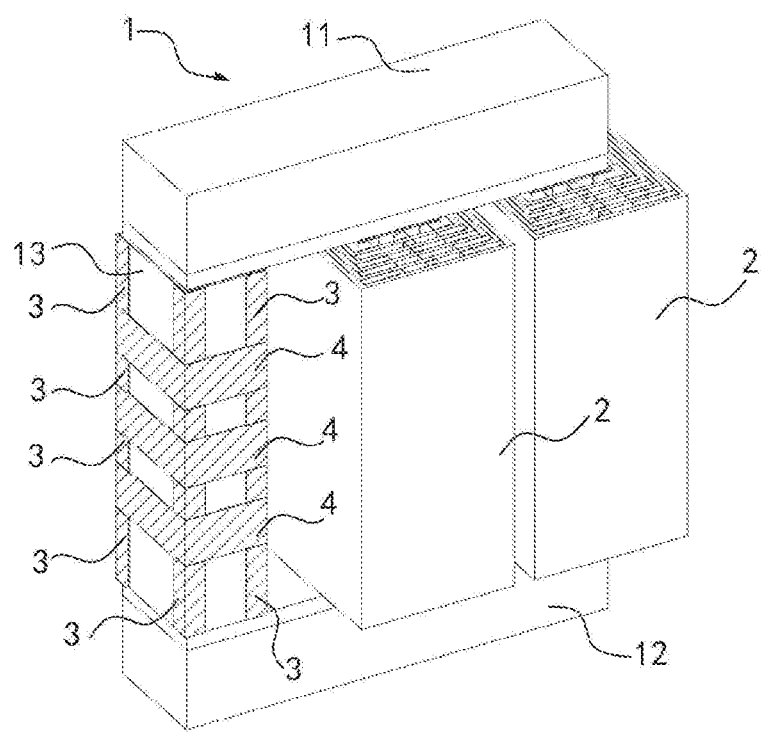
FIG. 2 shows a perspective view of the magnetic assembly according to the second embodiment of the present disclosure.

Referring to FIG. 2, FIG. 2 shows a perspective view of the magnetic assembly according to the second embodiment of the present disclosure. The magnetic assembly according to the second embodiment differs from the first embodiment in that:

The second semiconducting tape 4 covers the first air gap. That is, the second semiconducting tape 4 pastes on the lateral surface of the core column 13, and respectively covers one surface of two transverse ridges which defines the first air gap, thus covering the first air gap, instead of pasting a second semiconducting tape 4 at each transverse ridge as shown in FIG. 1, the manufacturing process of the magnetic assembly of the second embodiment is relatively simple.

The other structure of the magnetic assembly according to the second embodiment is almost the same as the first embodiment, and will be omitted here.

Embodiment 3

Figure 3:
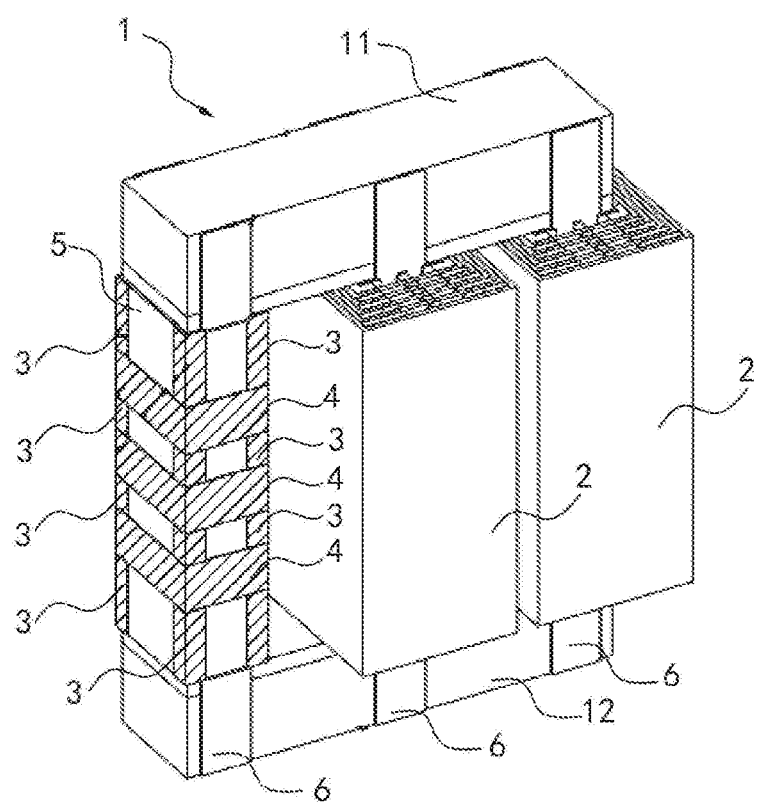
FIG. 3 shows a perspective view of the magnetic assembly according to the third embodiment of the present disclosure.

Referring to FIG. 3, FIG. 3 shows a perspective view of the magnetic assembly according to the third embodiment of the present disclosure. The magnetic assembly according to the third embodiment differs from the second embodiment in that:

The reactor according to the third embodiment further includes an insulating cylinder 5 fitted around of the core column 13. The cross sectional shape of the insulating cylinder 5 may be the same as that of the core column 13. In the case that the winding 2 is wound around the insulating cylinder 5, both of the first semi-conductive component 10 and the second semi-conductive component 20 may be provided on the insulating cylinder 5 (see FIG. 3). The projection of the semi-conductive component on the core column 13 covers the longitudinal ridges and the transverse ridges. Compared to the semi-conductive component directly provided on the core column the core column heat dissipation performance may be improved. However, the present disclosure is not limited thereto, both of the first semi-conductive component 10 and the second semi-conductive component 20 may also provided directly on the core column 13, or may provided on both of the core column 13 and the insulating cylinder 5.

As shown in FIG. 3, the reactor according to the third embodiment further includes multiple pulling plates 6. In each of opposite lateral surfaces of one core column 13, such as a front surface and a back surface, is provided with a pulling plate 6. In other embodiment, two core columns 13 located on the outside of the magnetic core 1 may also have a pulling plate 6 at left or right surface respectively. However, the present disclosure is not limited thereto.

The pulling plate 6 is provided inside the insulating cylinder 5, and contacts with the core column 13, the upper cover 11, and the lower cover 12 respectively. The pulling plate 6 is used to connect and fix the core column 13, the upper cover 11, and the lower cover 12. The pulling plate 6 has a width less than or equal to the width of the lateral surface of the core column 13 contacting with the pulling plate 6. In this embodiment, the projection of the first semi-conductive tape 3 disposed on the insulating cylinder 5 on the core column also covers a part of the border of the pulling plate 6 contacting with the core column 13.

The other structure of the magnetic assembly according to the third embodiment is almost the same as the second embodiment, and will be omitted here.

Embodiment 4

Figure 4:
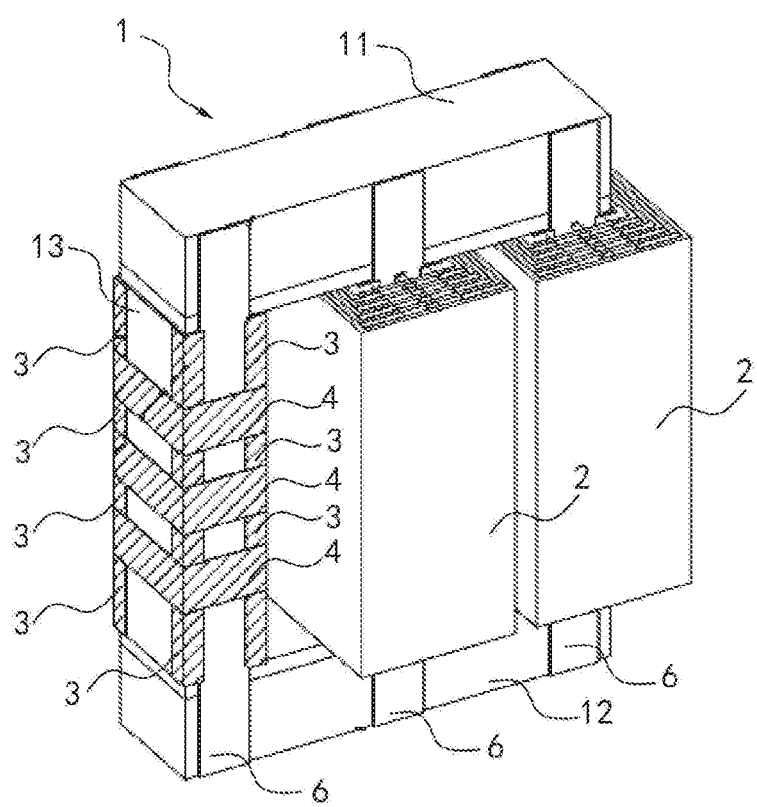
FIG. 4 shows a perspective view of the magnetic assembly according to the fourth embodiment of the present disclosure.

Referring to FIG. 4. FIG. 4 shows a perspective view of the magnetic assembly according to the fourth embodiment of the present disclosure. The magnetic assembly according to the fourth embodiment differs from the third embodiment in that:

The reactor according to the fourth embodiment of the present disclosure is not provided with an insulating cylinder 5.

Both of the first semi-conductive component 10 and the second semi-conductive component 20 are provided directly on the core column 13 and the pulling plate 6. In details, the first semi-conductive tape 3 disposed on the core column 13 may also cover the part of the border of the pulling plate 6 contacting with the core column 13; the second semiconducting tape 4 is wound around the core column 13 and the pulling plate 6, and the second semiconducting tape 4 on the core column 13 covers the first air gap.

The other structure of the magnetic assembly according to the fourth embodiment is almost the same as the third embodiment, and will be omitted here.

Embodiment 5

Figure 5:
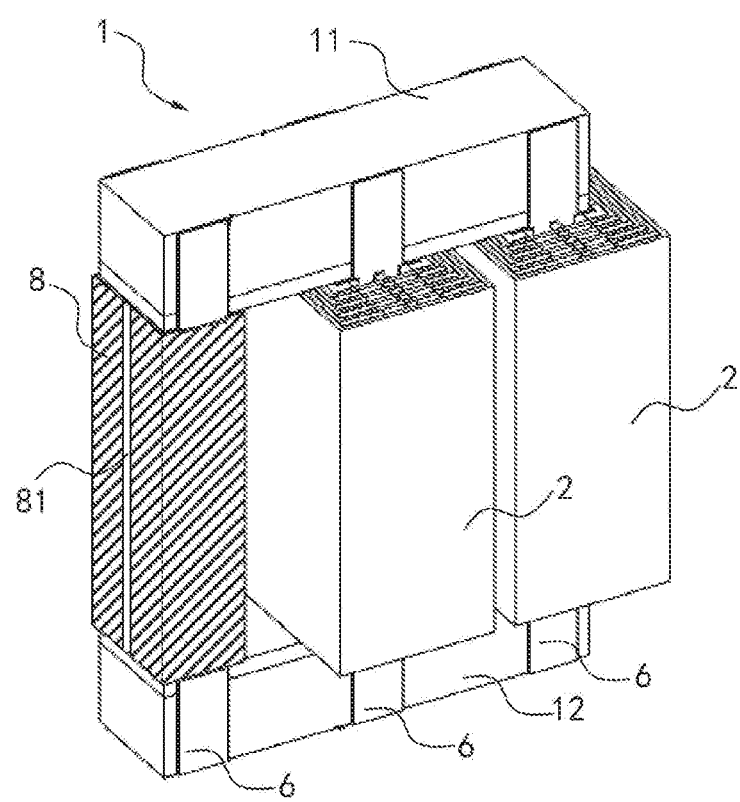
FIG. 5 shows a perspective view of the magnetic assembly according to the fifth embodiment of the present disclosure.

Referring to FIG. 5, FIG. 5 shows a perspective view of the magnetic assembly according to the fifth embodiment of the present disclosure. The magnetic assembly according to the fifth embodiment differs from the fourth embodiment in that:

The reactor according to the fifth embodiment of the present disclosure includes only one first semi-conductive component such as a semi-conductive film 8, which wraps around all of the lateral surfaces of the core column 13. In the case that a pulling plate 6 is provided, the semi-conductive film 8 may also wrap around the pulling plate 6. The semi-conductive film 8 covers all of the longitudinal ridges of the core column 13, the first air gap and the part of the border of the pulling plate 6 contacting with the core column 13, greatly reducing the manufacturing process of the magnetic assembly. The above structure may be used in low-power magnetic assembly or in the magnetic assembly which does not require high heat dissipation performance. In other embodiments, in the case that the insulating cylinder 5 is provided, the semi-conductive film 8 may also wrap around the lateral surfaces of the insulating cylinder 5. The semi-conductive film also can be replaced by other semi-conductive materials.

Further, along longitudinal direction of the core column 13, a longitudinal opening 81 is provided in the semi-conductive film 8, so as to avoid the formation of loops which may generate induced currents, the loss due to the semi-conductive film 8 is reduced and there is no additional load loss.

The other structure of the magnetic assembly according to the fifth embodiment is almost the same as the fourth embodiment, and will be omitted here.

Embodiment 6

Figure 6:
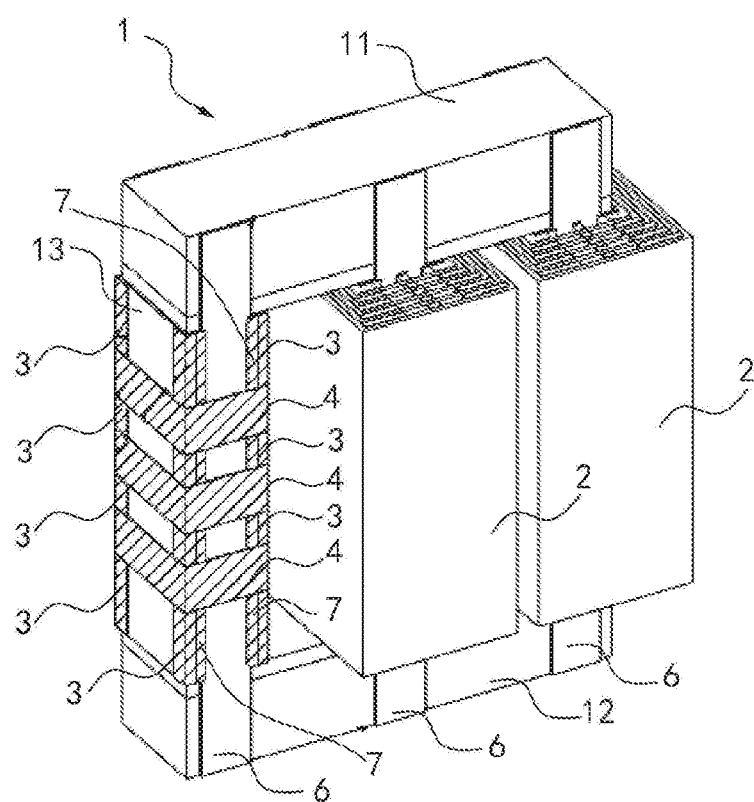
FIG. 6 shows a perspective view of the magnetic assembly according to the sixth embodiment of the present disclosure.

Referring to FIG. 6, FIG. 6 shows a perspective view of the magnetic assembly according to the sixth embodiment of the present disclosure. The magnetic assembly according to the sixth embodiment differs from the fourth embodiment in that:

The reactor according to the sixth embodiment of the present disclosure further includes a third semi-conductive component such as a third semi-conductive tape 7, which is used independently to cover the part of the border of the pulling plate 6 contacting with the core column 13. For example, the third semi-conductive tape 7 may directly pasted on the lateral surfaces of the core column 13 and the pulling plate 6. In other embodiments, in the case that the reactor is provided with an insulating cylinder 5, the third semi-conductive tape 7 may pasted on the insulating cylinder 5 at the position corresponding to the border of the pulling plate 6, which is the position that the projection of the third semi-conductive tape 7 on the core column 13 may cover the part of the border of the pulling plate 6 contacting with the core column 13. The third semi-conductive tape 7 may also be replaced by a third semi-conductive film or the like. The material of the third semi-conductive component may be the same as the first semi-conductive component 10 and the second semi-conductive component 20.

The other structure of the magnetic assembly according to the sixth embodiment is almost the same as the fourth embodiment, and will be omitted here.

Embodiment 7

Figure 7:
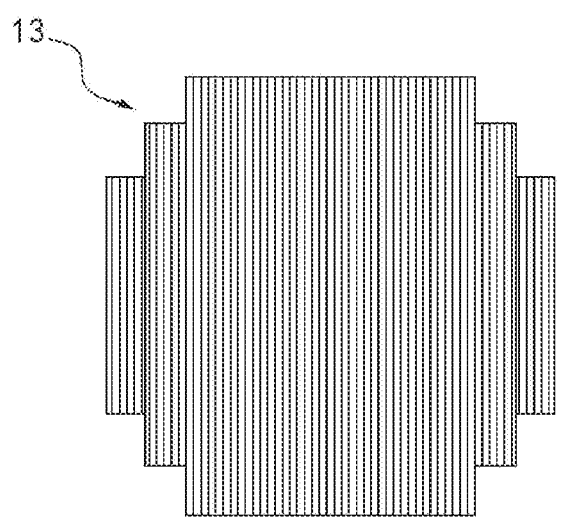
FIG. 7 shows a cross-sectional view of the magnetic core of the magnetic assembly according to the seventh embodiment of the present disclosure.

Referring to FIG. 7, FIG. 7 shows a cross-sectional view of the magnetic core of the magnetic assembly according to the seventh embodiment of the present disclosure. The magnetic assembly according to the seventh embodiment differs from the first embodiment in that:

The core column 13 of the magnetic core 1 is a symmetrical structure made of three kinds of silicon steel sheets of different widths, forming a total of nine longitudinal ridges. Each of the longitudinal ridges can be pasted with one first semi-conductive tape 3. This kind of core column may be applied to any of the preceding embodiments.

The other structure of the magnetic assembly according to the seventh embodiment is almost the same as the first embodiment, and will be omitted here.

The magnetic assembly of the present disclosure includes a magnetic core and a winding which is wound around the core column of the magnetic core. The electric field intensity between the winding and the longitudinal ridge of the core column is high where a partial discharge is likely to occur. The first semi-conductive component 10 is provided between the core column and the winding at the position corresponding to the longitudinal ridge, which may reduce the electric field strength therebetween, so that the electric field intensity between the winding and the core column tends to be uniform, and the risk of partial discharge of the magnetic assembly may be effectively reduced. Therefore, the magnetic assembly of the present disclosure has high reliability.

Relative terms may be used in the above embodiments, such as "above" or "below", to describe the relative relationship of one element with respect to another element shown in the figures. It can be understood that if the shown device is turned upside down, the element described as being "above" will become a "below" element. The terms "a", "an", "the", and "at least one" are used to indicate the presence of one or more elements/components/and the like. The terms "include", "include" and "have" are intended to be inclusive and mean that there may be additional components or the like in addition to the listed components. "First" and "second" are only used as references and do not have limitation to the number of their subjects.

It should be understood that the disclosure does not limit its application to the detailed structure and arrangement of the components set forth herein. The disclosure can have other embodiments and be practiced and implemented in various ways. The foregoing variations and modifications fall within the scope of the disclosure. It should be understood that the disclosure disclosed and defined herein extends to all alternative combinations of two or more individual features mentioned in or evident from the text and/or drawings. All of these different combinations constitute multiple alternative aspects of the disclosure. The embodiments described herein illustrate the best mode known for practicing the disclosure and will enable those skilled in the art to utilize the disclosure.

What is claimed is:

1. A magnetic assembly, comprising:
   a magnetic core comprising an upper cover, a lower cover and a core column provided between the upper cover and the lower cover, the core column presents a prismatic shape and has at least two lateral surfaces, the lateral surfaces intersect with each other to form at least two longitudinal ridges, and the longitudinal ridge extends along the longitudinal direction of the core column;
   a winding, winding around the core column, a first semi-conductive component is provided between the core column and the winding at the position corresponding to the longitudinal ridge, and
   a pulling plate provided along a lateral surface of the core column,
   wherein the pulling plate is in contact with the core column, the upper cover and the lower cover, and has a width less than or equal to a width of the lateral surface,
   wherein the first semi-conductive component is wrapping around the lateral surface of core column and the pulling plate contacting with the core column.

2. The magnetic assembly according to claim 1, wherein a first air gap is formed on the core column, and a second semi-conductive component is provided between the core column and the winding at the position corresponding to the air gap.

3. The magnetic assembly according to claim 1, wherein a part of a border of the pulling plate contacting with the core column is covered by the first semi-conductive component.

4. The magnetic assembly according to claim 1, further comprising:
   at least one insulating cylinder respectively fitted around the core column.

5. The magnetic assembly according to claim 1, wherein the magnetic assembly is a medium-high voltage transformer or a medium-high voltage reactor.

6. The magnetic assembly according to claim 1, wherein the core column represents a prism shape with three, four, five, six, or eight ridges.

7. The magnetic assembly according to claim 1, wherein the first semi-conductive component is provided on the longitudinal ridge.

8. The magnetic assembly according to claim 1, further comprising:
   at least one insulating cylinder fitted around the core column, and the first semi-conductive component is provided on the insulating cylinder.

9. The magnetic assembly according to claim 8, wherein the first semi-conductive component is wrapping around lateral surfaces of the insulating cylinder.

10. The magnetic assembly according to claim 1, wherein the first semi-conductive component is wrapping around the lateral surfaces of the core column.

11. The magnetic assembly according to claim 10, wherein a longitudinal opening is defined on the first semi-conductive component.

12. The magnetic assembly according to claim 1, wherein a transverse ridge is formed due to a first air gap opened in the core column, and a second semi-conductive component is provided between the core column and the winding at the position corresponding to the transverse ridge.

13. The magnetic assembly according to claim 12, wherein the second semi-conductive component is a second semiconducting tape or a second semi-conductive paint layer.

14. The magnetic assembly according to claim 12, further comprising:
   a insulating cylinder fitted around the core column, and the second semi-conductive component is provided on the insulating cylinder.

15. The magnetic assembly according to claim 12 wherein the second semi-conductive component is provided on the core column and covers the air gap.

* * * * *